(12) United States Patent
Hasunuma

(10) Patent No.: US 8,011,526 B2
(45) Date of Patent: Sep. 6, 2011

(54) LOOSENING PREVENTION DEVICE FOR PLUG

(75) Inventor: Masahiro Hasunuma, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 720 days.

(21) Appl. No.: 12/063,372

(22) PCT Filed: Jul. 27, 2006

(86) PCT No.: PCT/JP2006/315344
§ 371 (c)(1),
(2), (4) Date: Feb. 8, 2008

(87) PCT Pub. No.: WO2007/018104
PCT Pub. Date: Feb. 15, 2007

(65) Prior Publication Data
US 2009/0134163 A1  May 28, 2009

(30) Foreign Application Priority Data

Aug. 11, 2005 (JP) .................................. 2005-233212

(51) Int. Cl.
*B65D 45/00* (2006.01)
(52) U.S. Cl. ........................................ 220/315; 215/274
(58) Field of Classification Search .................. 220/315, 220/319, 375; 215/274, 306; 138/95
See application file for complete search history.

(56) References Cited

U.S. PATENT DOCUMENTS

| 1,710,513 A | * | 4/1929 | Primrose | 138/95 |
| 3,635,370 A | * | 1/1972 | Romanauskas | 220/227 |
| 4,711,470 A | * | 12/1987 | Scahill | 285/30 |

FOREIGN PATENT DOCUMENTS

| JP | 1-275992 A | 11/1989 |
| JP | 2000-146089 A | 5/2000 |
| JP | 2005-69277 A | 3/2005 |
| JP | 2005-172192 A | 6/2005 |

* cited by examiner

*Primary Examiner* — Robin Hylton
(74) *Attorney, Agent, or Firm* — Millen, White, Zelano & Branigan, P.C.

(57) ABSTRACT

A loosening prevention device (1) for a plug includes: a first sleeve (11) engaged with and surrounding a first plug (70) attached to a lid of a liquid tank (60); a second sleeve (21) engaged with and surrounding a second plug (80) attached to the lid; and a connection means (24) for connecting and fixing the first sleeve and the second sleeve with each other. At least one flat surface (75, 85) is formed on an outer circumferential surface (74, 84) of both or either one of the first plug and the second plug, and at least one flat surface (12, 22) in surface contact with the flat surface of both or either one of the first plug and the second plug is formed on an inner circumferential surface of both or either one of the first sleeve and the second sleeve. With this arrangement, a plug for supplying pressurized-gas and a plug for discharging liquid can be firmly held.

5 Claims, 7 Drawing Sheets

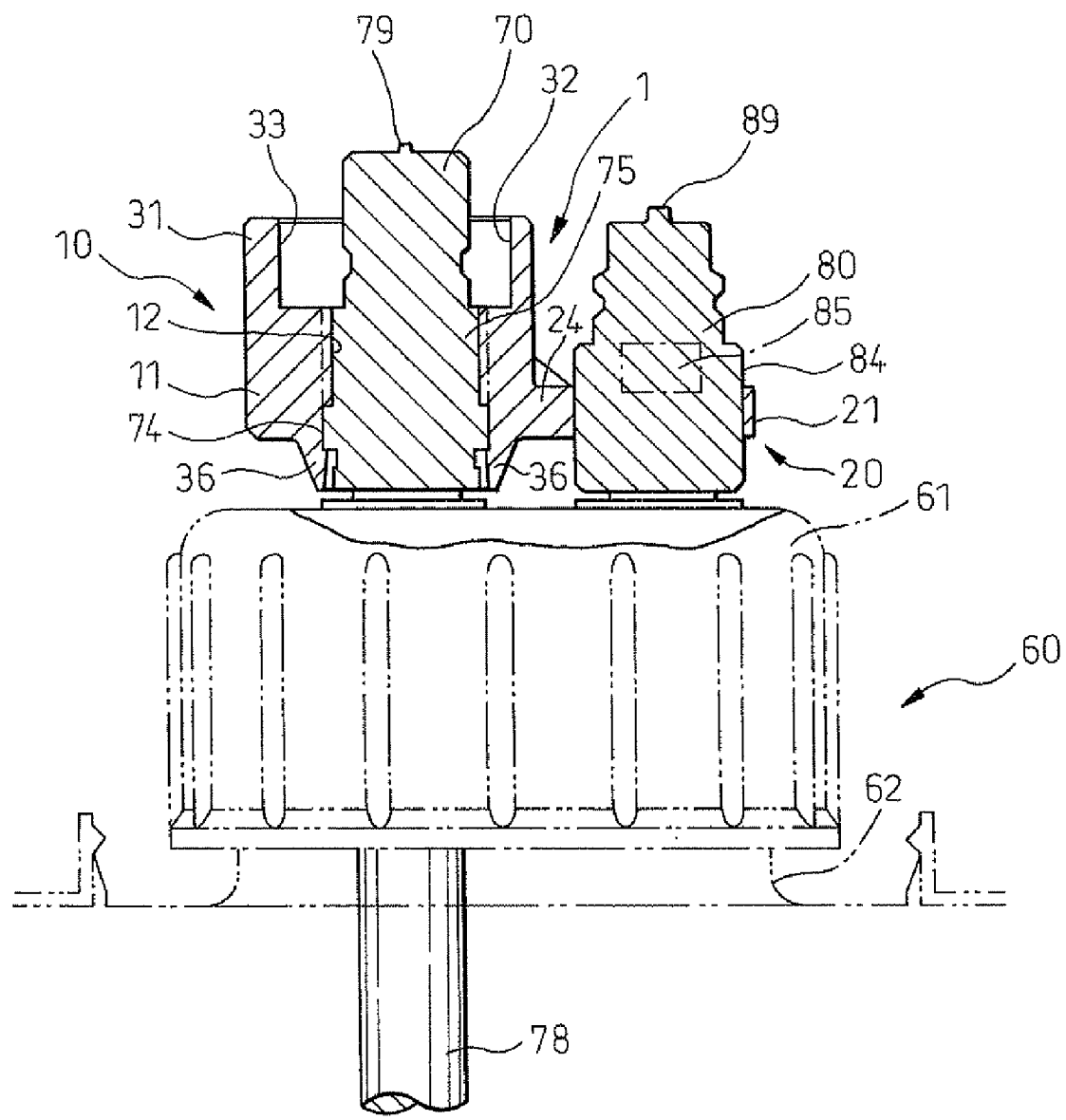

PRIOR ART

LOOSENING PREVENTION DEVICE FOR PLUG

TECHNICAL FIELD

The present invention relates to a loosening prevention device for a plug, and relates, more specifically, to a loosening prevention device for a plug that prevents loosening of a plug mounted on a top surface of a tank made of resin which discharges a liquid such as a highly-pure chemical like an etching liquid used in a semiconductor manufacturing process.

BACKGROUND ART

FIGS. 8a and 8b are a side cross-sectional view and a top plan view, respectively of a liquid discharge mechanism according to a conventional technique as described in Japanese Unexamined Patent Publication No. 2000-146089. The liquid discharge mechanism shown in these drawings has an inner lid 111 arranged on a mouth of a liquid tank not shown. Two female screw holes 112 and 113 are formed on the inner lid 111. A plug 114 for supplying pressurized gas and a plug 115 for discharging liquid are screwed in the female screw holes 112 and 113, respectively.

As can be seen from FIG. 8b, plural flat surfaces 122 and 134, respectively, for example, four flat surfaces 122 and 134, respectively, are formed at each equal angle, around circumferential surfaces of the plugs 114 and 115, respectively. The plugs 114 and 115 are aligned so that each one flat surface 122 of the plug 114 faces in parallel with each one flat surface 134 of the plug 115. A rotation prevention member 124 that prevents a rotation of the plugs 114 and 115 is laid out between the mutually opposite flat surfaces 122 and 134, and is fastened to the top surface of the inner lid 111 with a screw 160. With this arrangement, a flat surface 123 of the rotation prevention member 124 is brought into contact with the flat surfaces 122 and 134 of the plugs 114 and 115, respectively, thereby preventing a rotation of the plugs 114 and 115. Usually, the shown liquid discharge mechanism is held on the mouth of the liquid tank with a circular cap (not shown). When gas is supplied from the plug for supplying pressurized-gas into the liquid tank, the liquid within the liquid tank is discharged through the plug for discharging liquid.

However, in the liquid discharge mechanism of the conventional technique as disclosed in Japanese Unexamined Patent Publication No. 2000-146089, each of the flat surfaces 122 and 134 with which the rotation prevention member 124 is in contact is smaller than a quarter of the entire circumferential surface of the corresponding plugs 114 and 115, respectively. Therefore, the force of the rotation prevention member 124 for holding the plugs 114 and 115 is relatively small. Because the rotation prevention member 124 is merely fastened with the screw 160, when the screw 160 is loosened, the plugs 114 and 115 are rotated and loosened, and are likely to be separated from the inner lid 111.

Although not shown in FIG. 8a, front ends of the plugs 114 and 115 are connected to a socket for supplying pressure-gas and a socket for discharging liquid, respectively. At the time of disconnecting these sockets, an operator may pull these sockets while swinging the sockets back and forth, without directly pulling up the sockets. In this case, the screw 160 of the rotation prevention member 124 is loosened. Thus, the plugs 114 and 115 are also rotated and loosened, and are likely to be separated from the inner lid 111.

The present invention has been made in the light of the above problem, and has an object of providing a loosening prevention device for a plug, which makes it possible to firmly hold the plug for supplying pressurized-gas and for discharging liquid.

SUMMARY OF INVENTION

In order to achieve the above object, according to a first aspect of the present invention, there is provided a loosening prevention device for a plug, the loosening prevention device including: a first sleeve engaged with and surrounding a first plug attached to a lid of a liquid tank; a second sleeve engaged with and surrounding a second plug attached to the lid; and a connection means for connecting and fixing the first sleeve and the second sleeve with each other, wherein at least one flat surface is formed on an outer circumferential surface of both or either one of the first plug and the second plug, and at least one flat surface in surface contact with the flat surface of both or either one of the first plug and the second plug is formed on an inner circumferential surface of both or either one of the first sleeve and the second sleeve.

In the first aspect, the entire outer circumferential surface of the first plug and the second plug are engaged with the first sleeve and the second sleeve respectively. Further, the flat surface of the first plug and the flat surface of the second plug as a part of the outer circumferential surfaces, respectively are in surface contact with the corresponding flat surfaces of the first sleeve and the second sleeve, respectively. Therefore, the first plug and the second plug can be firmly held without generating a rotation.

According to a second aspect, as in the first aspect, both or either one of the first sleeve and the second sleeve is engaged with both or either one of the first plug and the second plug by snap-fitting correspondingly.

In the second aspect, even when the operator pulls out the socket while swinging the socket at the time of disconnecting the socket, the loosening prevention device for a plug can prevent the first and the second plugs from being separated.

According to a third aspect, as in the first or the second aspect, the loosening prevention device for a plug integrally includes a third sleeve coaxial with the first sleeve and also having an inner diameter larger than an inner diameter of the first sleeve, the third sleeve is engaged with and surrounds a socket connected to the first plug, and at least one key or keyway extending to an axial direction is formed on an outer circumferential surface of the socket, and at least one keyway or key engaged with the at least one key or keyway of the socket is formed on an inner circumferential surface of the third sleeve.

In the third aspect, it is possible to prevent the operator from erroneously connecting a other socket instead of a socket for a specific liquid. Preferably, two keys and two keyways are formed.

According to a fourth aspect, as in the third aspect, a through-hole is formed on a shoulder between the first sleeve and the third sleeve.

In the fourth embodiment, accumulation of a liquid in the third sleeve can be prevented.

According to a fifth aspect, in the third or the fourth aspect, at least one flat surface is formed on an outer circumferential surface of the socket, and at least one flat surface in surface contact with the flat surface of the socket is formed on an inner circumferential surface of the third sleeve.

In the fifth aspect, the socket engaged with the third sleeve can be prevented from being separated.

These objects, characteristics, advantages, and other objects of the present invention will become clearer from the detailed explanation of the exemplified embodiments of the present invention depicted in the accompanying drawings.

BRIEF DESCRIPTION OF THE DRAWINGS

FIG. 2 is a cross-sectional view in an axial direction of a liquid discharge mechanism using the loosening prevention device for a plug according to the present invention.

FIG. 7b is a bottom view of the sliding sleeve shown in FIG. 7a.

BEST MODE FOR CARRYING OUT THE INVENTION

Figure 1A:
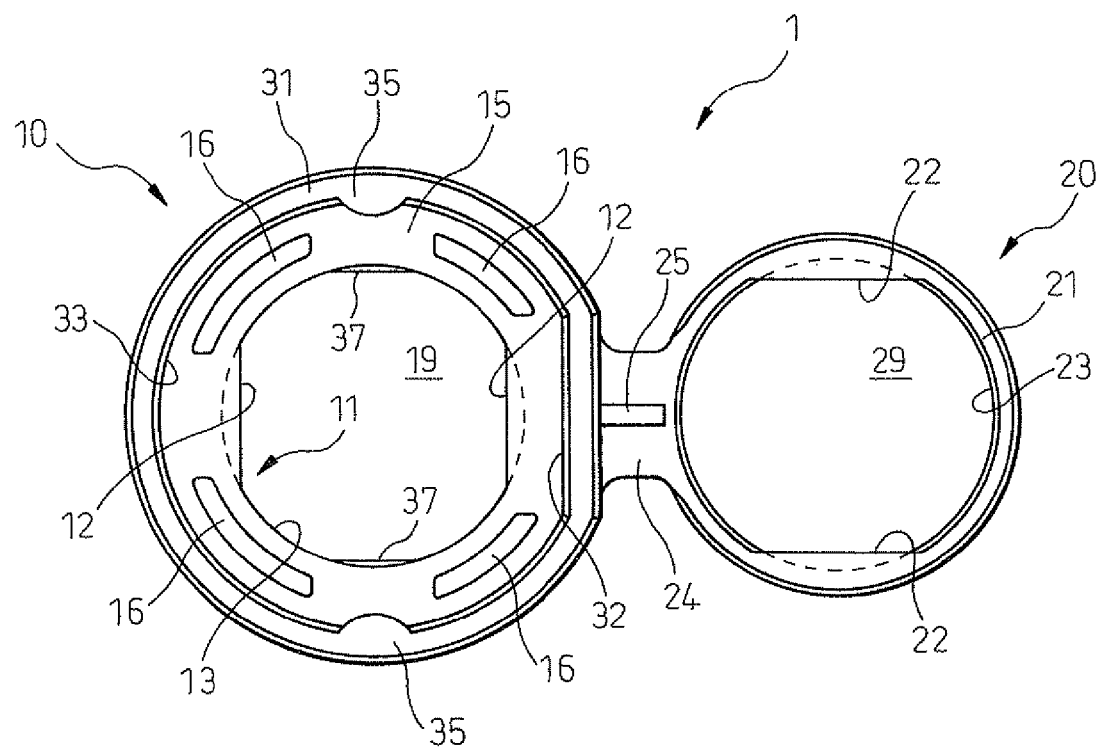
FIG. 1a is a top plan view of a loosening prevention device for a plug according to the present invention.

An embodiment of the present invention is explained below with reference to the accompanying drawings. In the following drawings, the same members are assigned like reference numerals. To facilitate understanding, the scales of the drawings have been appropriately changed.

Figure 1B:
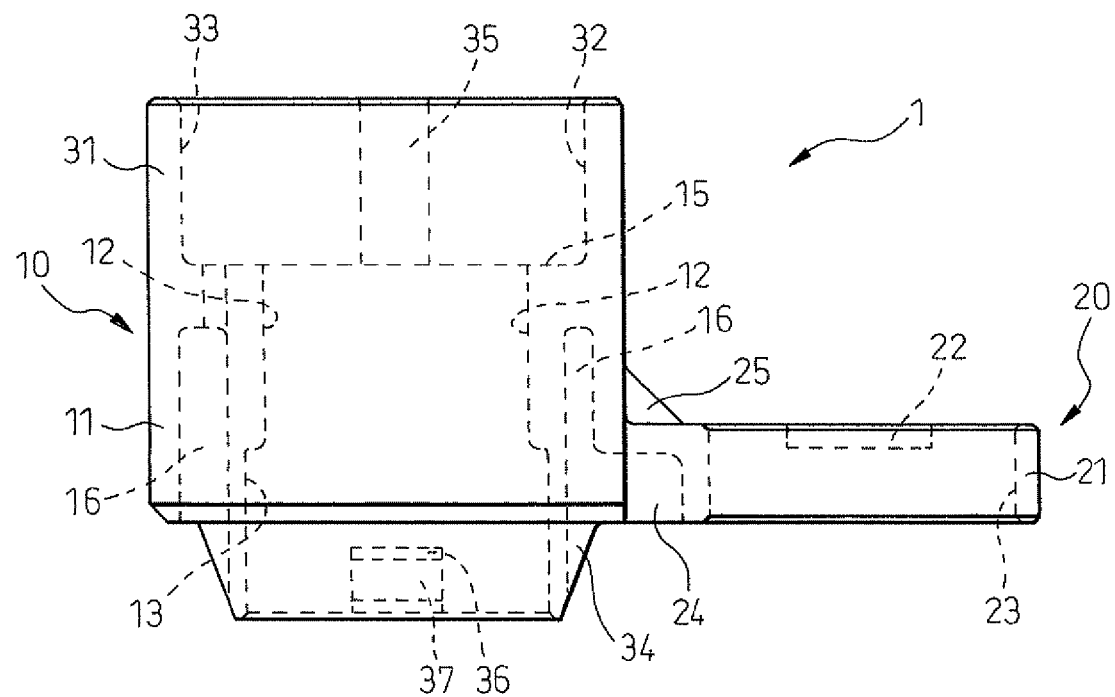
FIG. 1b is a side view of the loosening prevention device for a plug shown in FIG. 1A.

FIG. 1a is a top plan view of a loosening prevention device for a plug according to the present invention. FIG. 1b is a side view of the loosening prevention device for a plug shown in FIG. 1a. As shown in these drawings, a loosening prevention device 1 for a plug according to the present invention includes a first sleeve 11 and a second sleeve 21 arranged in parallel with the first sleeve 11. A hole 19 of the first sleeve 11 is adapted to be engaged with an outer circumferential surface of a plug 70 (not shown in FIGS. 1a and 1b) for discharging liquid, and a hole 29 of the second sleeve 21 is adapted to be engaged with a plug 80 (not shown in FIGS. 1a and 1b) for supplying pressurized-gas. The second sleeve 21 may be also called a sleeve 20 at the side of the plug for supplying pressurized-gas. The first sleeve 11 and the second sleeve 21 are connected with each other by a connection member 24. In the preferable embodiment, the first sleeve 11, the second sleeve 21, and the connection member 24 are integrally formed from rigid plastic such as polypropylene, along with a third sleeve 31, which is described later. Preferably, a reinforcing bracket 25 is provided on the connection member 24, to firmly hold the first sleeve 11 and the second sleeve 21.

Plural flat surfaces 12, or two flat surfaces 12 in FIG. 1a, are extended in the axial direction of the first sleeve 11, on an inner circumferential surface 13 of the first sleeve 11. As can be seen from FIG. 1b, the flat surfaces 12 are parallel with each other, and are formed in the axial direction exceeding an intermediate part of the first sleeve 11 from an upper end of the first sleeve 11.

The third sleeve 31 coaxial with the first sleeve 11 is provided integrally with the first sleeve 11 above the first sleeve 11. The first sleeve 11 and the third sleeve 31 may be also collectively called a sleeve 10 at the side of the plug for discharging liquid. As shown in the drawings, while an outer circumferential surface of the third sleeve 31 is flush with an outer circumferential surface of the first sleeve 11, a diameter of an inner circumferential surface 33 of the third sleeve 31 is set larger than a diameter of the inner circumferential surface 13 of the first sleeve 11.

As can be seen from FIG. 1a, one flat surface 32 is formed at a position adjacent with the connection member 24 on the inner circumferential surface 33 of the third sleeve 31. In FIG. 1a, the flat surface 32 of the third sleeve 31 is parallel with the flat surface 12 of the first sleeve 11. Two keys 35 are provided on the inner circumferential surface 33 of the third sleeve 31. These keys 35 are extended in the axial direction of the third sleeve 31 on the inner circumferential surface 33. These keys 35 are not limited to be formed at positions shown in FIG. 1a, and the layout of the keys 35 is described in detail later.

As shown in the drawings, a shoulder 15 facing the opening of the third sleeve 31 is formed between the first sleeve 11 and the third sleeve 31. Plural through-holes 16, or four through-holes 16 in FIG. 1a, are formed at equal intervals in the circumferential direction, on the shoulder 15. These through-holes 16 are extended in the axial direction in a thickness part of the first sleeve 11, and are open at a lower end of the first sleeve 11. These through-holes 16 have a function of preventing accumulation of a liquid in the third sleeve 31, at the time of connecting and disconnecting a socket 90 for discharging liquid described later. Usually, before a new socket 90 for discharging liquid is connected and disconnected, the socket 90 and the plug 70 are washed with water. Therefore, the forming of the through-holes 16 is particularly advantageous in this case.

A tapered part 34 coaxial with the first sleeve 11 is integrally provided at a lower end of the first sleeve 11. An inner circumferential surface of the tapered part 34 is flush with the inner circumferential surface 13 of the first sleeve 11. As shown in FIG. 1b, a pair of engagement pawls 36 laid out in parallel with each other are provided on the inner circumferential surface of the tapered part 34. As shown in FIG. 1a, stop parts 37 of these engagement pawls 36 are slightly projected inwardly from the inner circumferential surface 13.

On the other hand, plural flat surfaces 22, or two flat surfaces 22 in FIG. 1a, are extended in the axial direction of the second sleeve 21, on an inner circumferential surface 23 of the second sleeve 21. These flat surfaces 22 are parallel with each other, and are partially formed in the axial direction from an upper end of the second sleeve 21.

As can be seen from FIG. 1a, the pair of flat surfaces 22 of the second sleeve 21 and the pair of flat surfaces 12 of the first sleeve 11 are formed perpendicularly with each other. In this case, the plug 70 for discharging liquid and the plug 80 for supplying pressurized-gas described later can be held most firmly. However the pair of flat surfaces 22 and the pair of flat surfaces 12 may be formed at other angle instead of being formed perpendicularly to each other, or these pairs of flat surfaces 22 and 21 may be formed in parallel with each other.

FIG. 2 is a cross-sectional view in an axial direction of a liquid discharge mechanism using the loosening prevention device for a plug according to the present invention. In FIG. 2, a known liquid tank 60 having a mouth 62 is shown. The liquid tank 60 is filled with a liquid such as a highly pure chemical like an etching liquid used in a semiconductor manufacturing process, for example.

A circular cap 61 is engaged with the mouth 62 in a known format. The circular cap 61 is also formed with two male screw holes not depicted. The plug 80 for supplying pressurized-gas and the plug 70 for discharging liquid are screwed into these male screw holes, respectively. As shown in FIG. 2 etc., a flat surface 85 is provided on an outer circumferential surface 84 of the plug 80 for supplying pressurized-gas. In the present embodiment, two flat surfaces 85 are provided in parallel with each other.

A flat surfaces 75 are also provided on an outer circumferential surface 74 of the plug 70 for discharging liquid. Like the plug 80 for supplying pressurized-gas, in the present embodiment, two flat surfaces 75 are provided in parallel with each other. A siphon tube 78 extending downward from the plug 70 can extend to near the bottom of the liquid tank 60.

The plug 80 for supplying pressurized-gas and the plug 70 for discharging liquid may be also integrally formed with the circular cap 61. Alternatively, the plug 80 and the plug 70 may be attached to the circular cap 61 with other method. Like in the above-described conventional technique, a circular cap is also engaged with an inner lid (not shown) into which the plugs 70 and 80 are screwed.

As can be seen from FIG. 2, first, the plug 70 for discharging liquid and the plug 80 for supplying pressurized-gas are aligned so that the pair of flat surfaces 75 of the plug 70 for discharging liquid and the pair of flat surfaces 85 of the plug 80 for supplying pressurized-gas are perpendicular to each other. Then, the hole 19 of the first sleeve 11 in the sleeve 10 at the side of the plug for discharging liquid is passed through the plug 70 for discharging liquid, and the hole 29 of the second sleeve 21 is passed through the plug 80 for supplying pressurized-gas, thereby laying out the loosening prevention device 1 for a plug on the plug 70 for discharging liquid and the plug 80 for supplying pressurized-gas.

Accordingly, the inner circumferential surface 13 of the first sleeve 11 in the sleeve 10 at the side of the plug for discharging liquid surrounds the outer circumferential surface 74 of the plug 70 for discharging liquid, and the inner circumferential surface 23 of the sleeve 20 at the side of the plug for supplying pressurized-gas surrounds the outer circumferential surface 84 of the plug 80 for supplying pressurized-gas. In this case, the flat surface 12 of the first sleeve 11 is in surface contact with the flat surface 75 of the plug 70 for discharging liquid, and the flat surface 22 of the second sleeve 21 is surface contact with the flat surface 85 of the plug 80 for supplying pressurized-gas.

In other words, in the present invention, the entire outer circumferential surfaces 74 and 84 of the plug 70 for discharging liquid and the plug 80 for supplying pressurized-gas are engaged with the first sleeve 11 of the loosening prevention device 1 for a plug. The flat surfaces 75 and 85 as a part of the outer circumferential surfaces 74 and 84 are in surface contact with the corresponding flat surfaces 12 and 22 of the loosening prevention device 1 for a plug.

Therefore, the loosening prevention device 1 for a plug has a relatively large amount of force for holding the plugs 70 and 80. Consequently, the plugs 70 and 80 are not rotated, and the loosening prevention device 1 for a plug can hold the plugs 70 and 80 more firmly than the rotation prevention member according to the conventional technique, which supports only a part of the plug. It should be noted that the number of the flat surfaces 12 provided on the first sleeve 11 can be further increased. In this case, the corresponding number of the flat surfaces 75 are formed on the plug 70.

Figure 3:
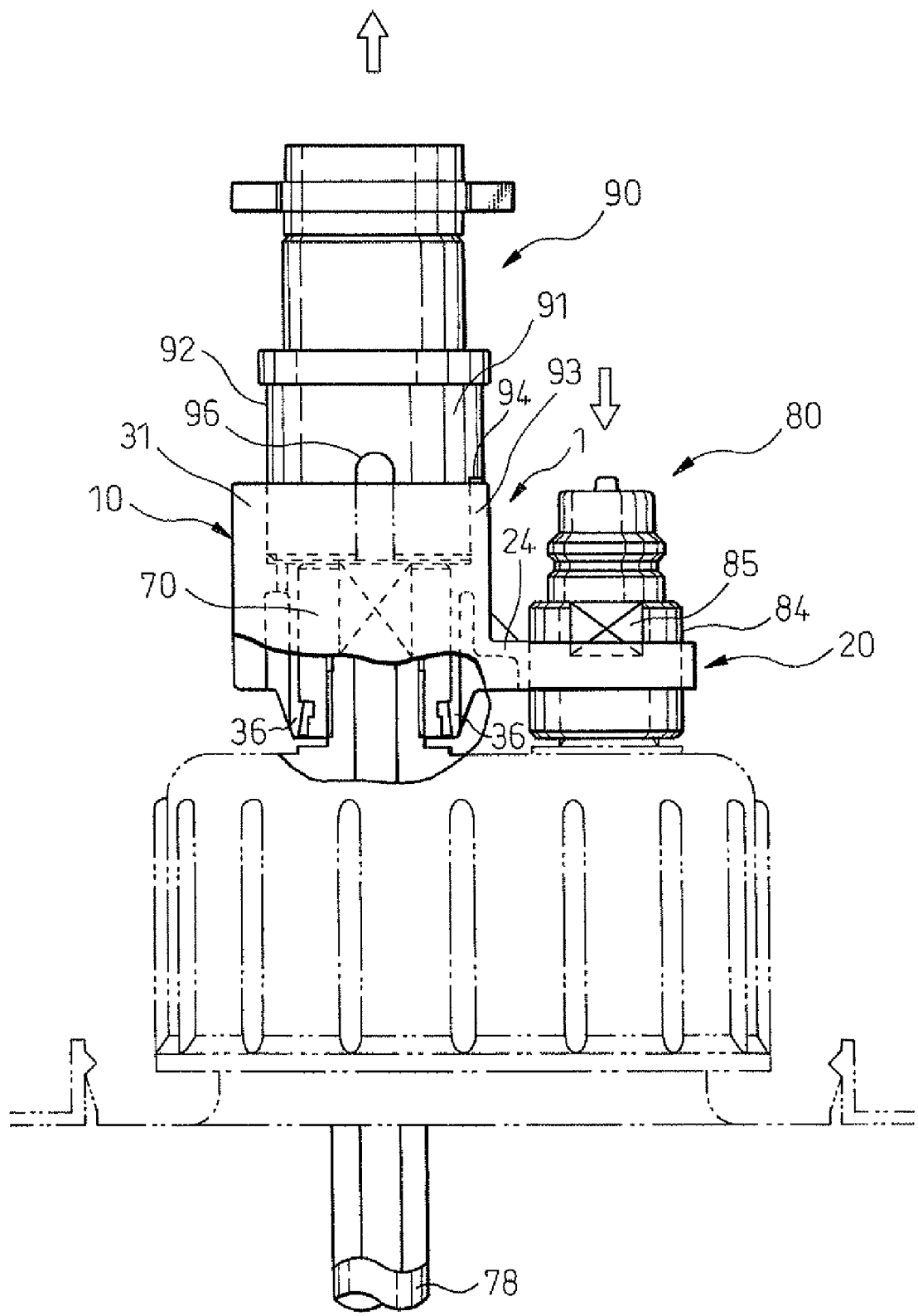
FIG. 3 is a partially broken side view of a liquid discharge mechanism using the loosening prevention device for a plug according to the present invention.
Figure 4:
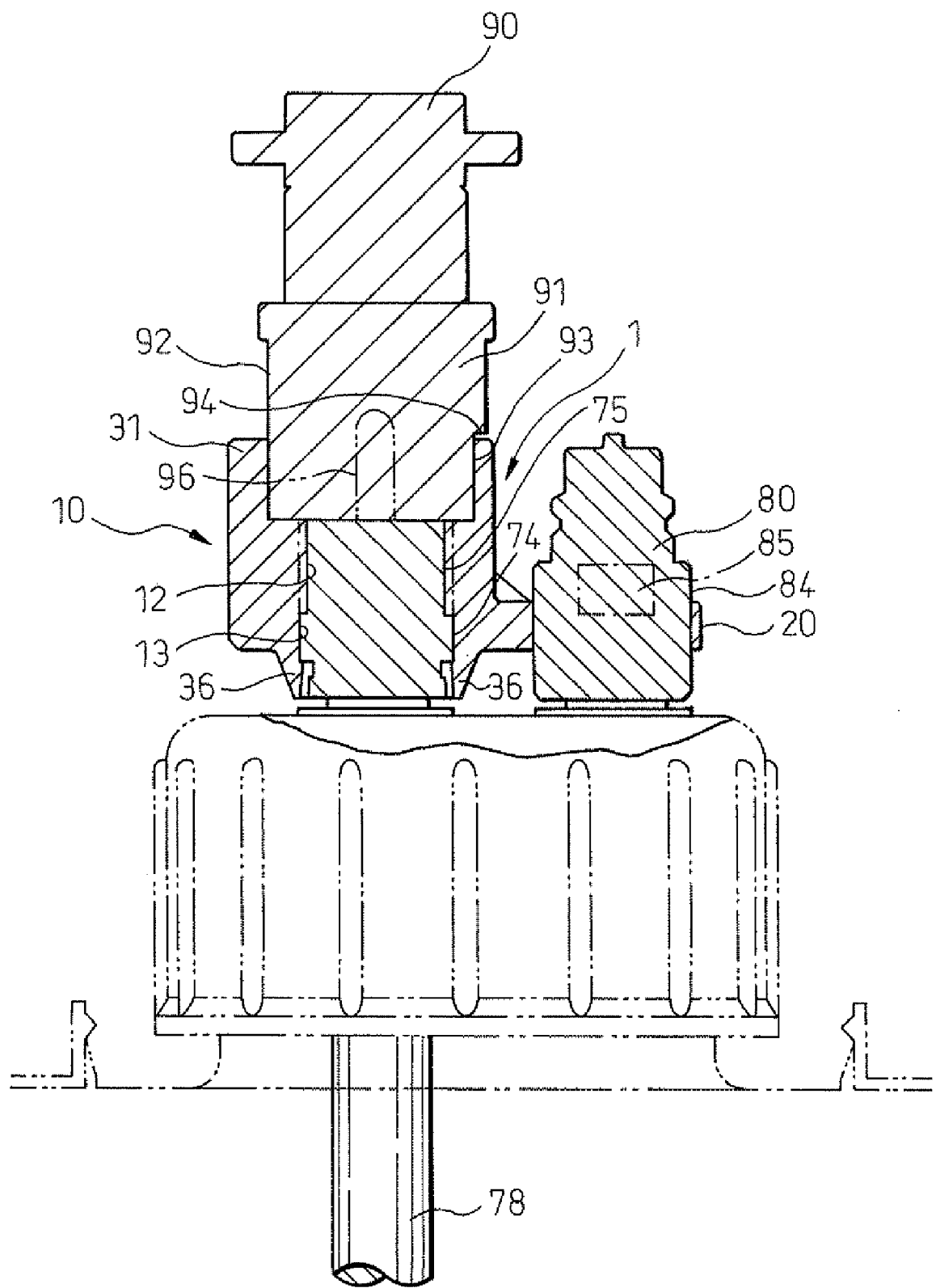
FIG. 4 is a cross-sectional view in an axial direction of a liquid discharge mechanism using the loosening prevention device for a plug according to the present invention.

FIG. 3 and FIG. 4 are a partially broken side view and a cross-sectional view in the axial direction, respectively of the liquid discharge mechanism using the loosening prevention device for a plug according to the present invention. After the loosening prevention device 1 for a plug is arranged on the plugs 70 and 80, the socket 90 for discharging liquid is inserted into the third sleeve 31 of the sleeve 10 at the side of the plug for discharging liquid. A sliding sleeve 91 that slides up and down is attached to the front end of the socket 90 for discharging liquid. Specifically, the sliding sleeve 91 of the socket 90 for discharging liquid is inserted into the third sleeve 31.

Figure 7A:
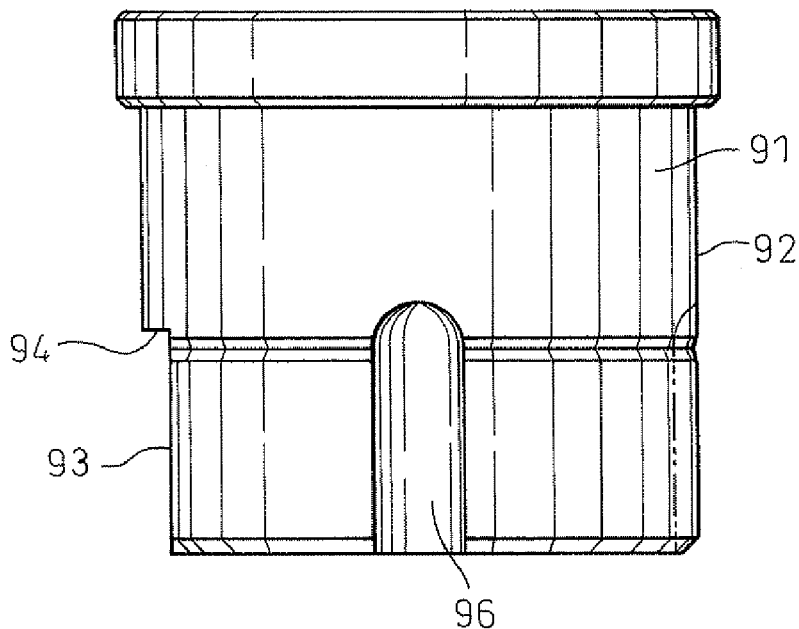
FIG. 7a is a side view of a sliding sleeve of a socket for discharging liquid.

As can be clearly seen by FIG. 3, FIG. 4, and FIG. 7a, one flat surface 93 is formed on the outer circumferential surface 92 of the sliding sleeve 91. The flat surface 93 is partially formed in the axial direction of the sliding sleeve 91 from the lower end of the sliding sleeve 91. This flat surface 93 is in surface contact with the flat surface 32 of the third sleeve 31. Further, keyways 96 corresponding to the two keys 35 shown in FIG. 1a are formed in the axial direction on the outer circumferential surface 92 of the sliding sleeve 91. These keyways 96 are adapted to be engaged with the keys 35 of the third sleeve 31.

The keys 35 of the third sleeve 31 and the keyways 96 of the sliding sleeve 91 are aligned together by setting the front end of the sliding sleeve 91 close to the upper end of the third sleeve 31, and the socket 90 for discharging liquid is pushed in the axial direction. As a result, a liquid discharge opening 79 (see FIG. 2) of the plug 70 for discharging liquid is opened. In this case, the entire outer circumferential surface 92 of the sliding sleeve 91 in the socket 90 for discharging liquid is also engaged with the third sleeve 31 of the loosening prevention device 1 for a plug. Further, the flat surface 93 as a part of the outer circumferential surface 92 is in surface contact with the corresponding flat surface 32 of the third sleeve 31, and the keys 35 of the third sleeve 31 are engaged with the keyways 96 of the sliding sleeve 91. As a result, the socket 90 for discharging liquid can be held. Consequently, the loosening prevention device 1 for a plug according to the present invention can firmly hold the socket 90 for discharging liquid (specifically, the sliding sleeve 91), in addition to the plugs 70 and 80.

While not shown in the drawings, a similar socket (not shown) is also attached to the plug 80 for supplying pressurized-gas, thereby opening a gas supply opening 89 (see FIG. 2) of the plug 80 for supplying pressurized-gas. Other sleeve (not shown) corresponding to the third sleeve may be provided coaxially on the second sleeve 21, and a socket for supplying pressurized-gas may be similarly engaged with the other sleeve. As a matter of course, both or either one of keys and keyways and flat surfaces are also formed on both or either one of the sleeves and sockets.

After assembling the socket 90 for discharging liquid and a socket for supplying pressurized-gas (not shown), when gas is supplied to the liquid tank 60 through the socket for supplying pressurized-gas (not shown) and the plug 80 for supplying pressurized-gas, a pressure is applied to the liquid within the liquid tank 60. Accordingly, the liquid within the liquid tank 60 rises within the siphon tube 78, passes through the plug 70 for discharging liquid and the socket 90 for discharging liquid, and is discharged to the outside of the liquid tank 60.

Figure 5:
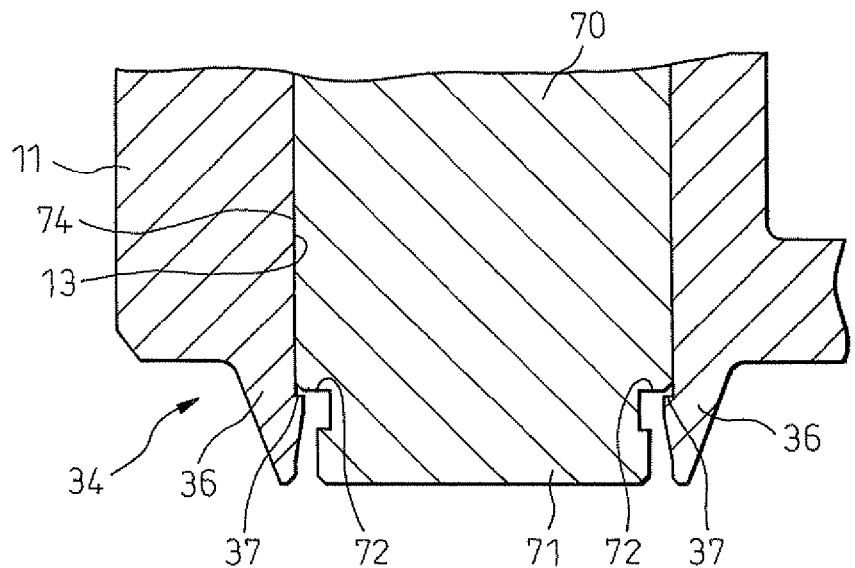
FIG. 5 is a partially enlarged view of the loosening prevention device shown in FIG. 2.

FIG. 5 is a partially enlarged view of the loosening prevention device shown in FIG. 2. As shown in FIG. 5, a shoulder 72 expanding in a radial direction is formed between a front end 71 of the plug 70 located at the circular cap 61 side and a main body of the plug 70. As described above, the stop parts 37 of the engagement pawls 36 provided on the first sleeve 11 are slightly projected inwardly from the inner circumferential surface 13 of the first sleeve 11.

When the plug 70 is passed through the first sleeve 11 of the loosening prevention device 1 for a plug, the engagement pawls 36 are brought into contact with the outer circumferential surface 74 of the plug 70, and are bent to the outside in the radial direction. When the shoulder 72 of the plug 70 exceeds the stop parts 37 of the engagement pawls 36, the engagement pawls 36 return to the inside in the radial direction. In other words, in the present invention, the first sleeve 11 of the loosening prevention device 1 for a plug is adapted to be fastened with the plug 70 by snap-fitting. Once the loosening prevention device 1 for a plug is fastened with the plug 70 by snap-fitting, the stop parts 37 of the first sleeve 11 are engaged with the shoulder 72. Accordingly, so long as an exclusive detaching tool is not used, the loosening prevention device 1 for a plug cannot be easily extracted.

In this connection, at the time of disconnecting the socket 90 for discharging liquid, the operator tends to pull the socket 90 for discharging liquid, while swinging the sockets back and forth. Because the loosening prevention device 1 for a plug is engaged with the plug 70 by snap-fitting, the loosening prevention device 1 for a plug is not detached from the plug 70 even in this case. Accordingly, in the present invention, it is possible to prevent the plug 70 from rotating and loosening due to the detachment of the loosening prevention device 1 for a plug, and also prevent the plug 70 from detaching from the circular cap 61. The second sleeve 21 can be also similarly fastened with the plug 80 for supplying pressurized-gas by snap-fitting.

Figure 6:
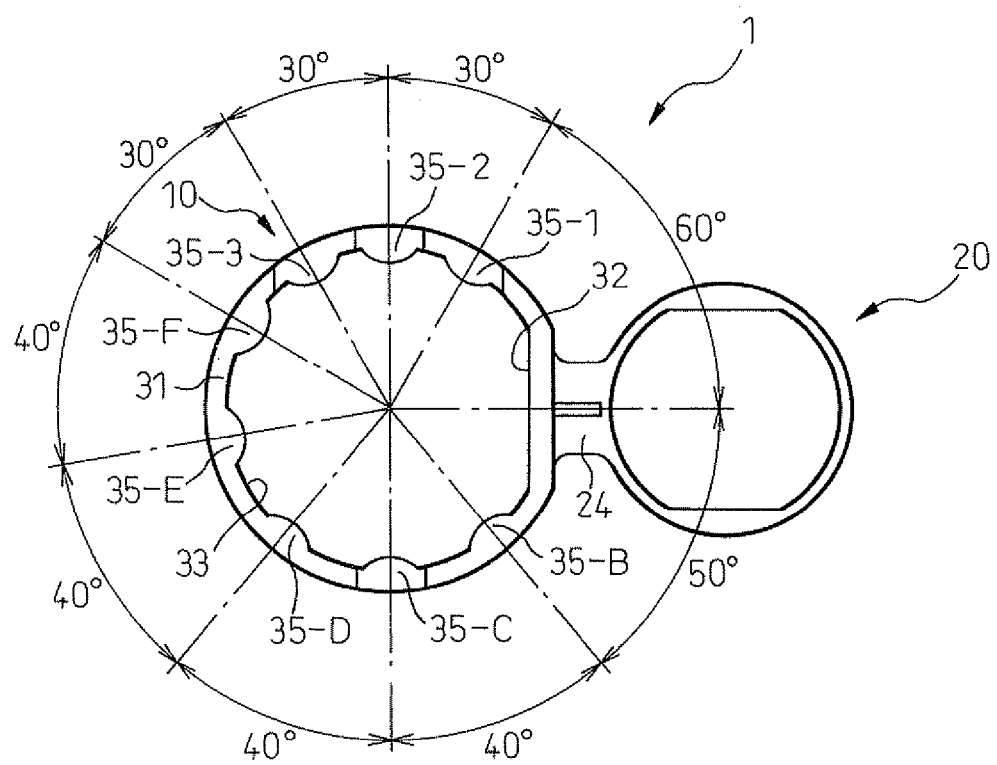
FIG. 6 shows an installation state of a key.

While the two keys 35 are formed in parallel with each other in FIG. 1a, these keys 35 may be also formed in a different shape from that shown in FIG. 1a. FIG. 6 shows a setting state of the keys. To facilitate the understanding, the first sleeve 11 and the shoulder 15 are not shown in FIG. 6.

In FIG. 6, a first group of keys 35-1 to 35-3 and a second group of keys 35-B to 35-F are depicted on the inner circumferential surface 33 except for the flat surface 32 of the third sleeve 31. In the first group of keys 35-1 to 35-3, each keys are arranged with an interval angle by 30° with each other. The second group of keys 35-B to 35-F are laid out adjacently to the first group of keys. In the second group of keys 35-B to 35-F, each keys are arranged with an interval angle by 40° with each other.

Figure 7B:
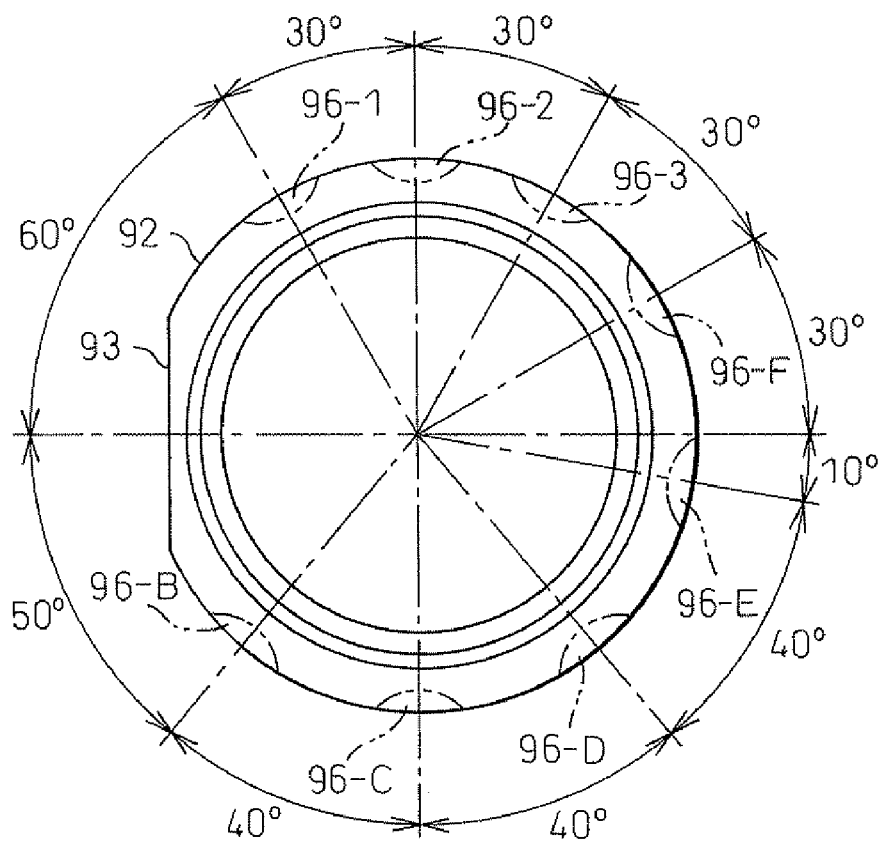
Figure 8A:
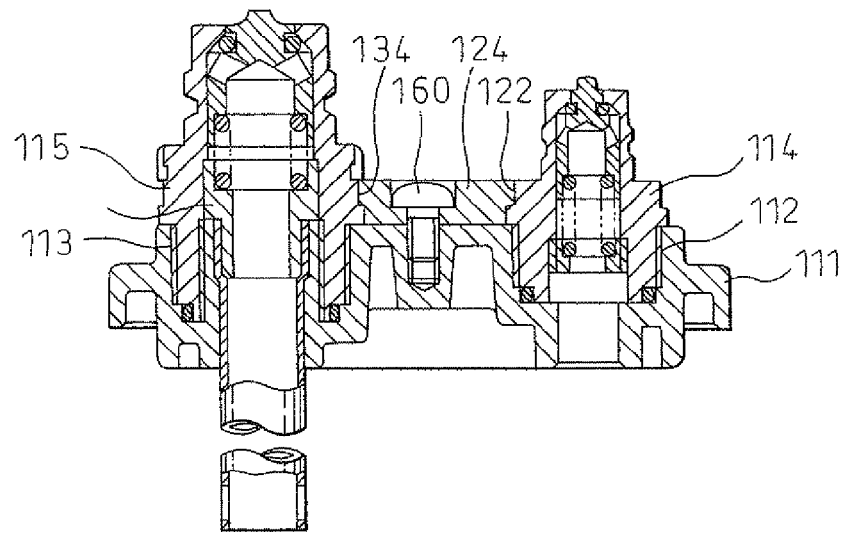
FIG. 8a is a cross-sectional view in the longitudinal direction of a loosening prevention device for a plug according to a conventional technique.
Figure 8B:
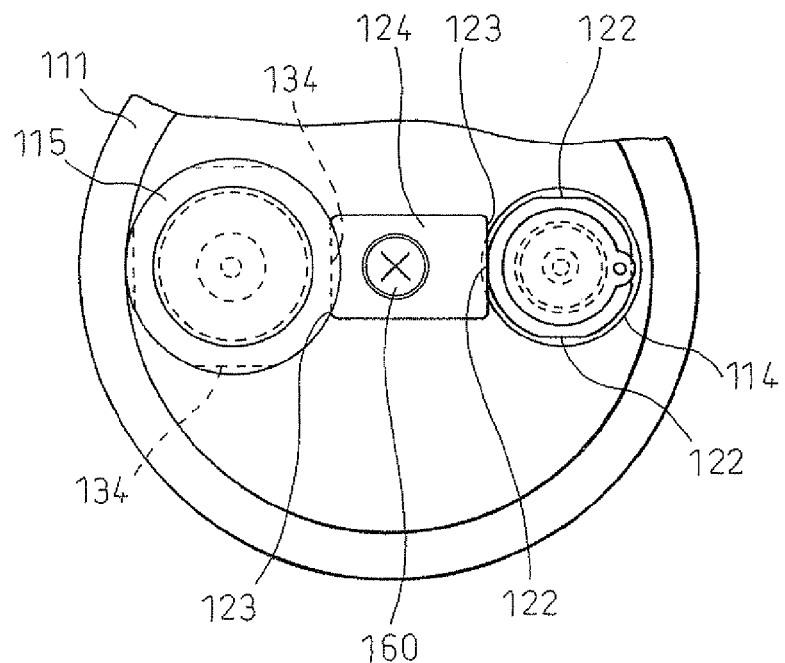
FIG. 8b is a top plan view of a loosening prevention device for a plug according to a conventional technique.

On the other hand, in FIG. 7b which is a bottom view of the sliding sleeve 91 a first group of keyways 96-1 to 96-3 and a second group of keyways 96-B to 96-F are depicted on the outer circumferential surface 92 of the sliding sleeve 91 except for the flat surface 93. As can be seen from FIG. 7b, positions of these groups of keyways correspond to the first and the second groups of keys shown in FIG. 6.

In the present invention, preferably, one key selected from the first group of keys 35-1 to 35-3 and one key selected from the second group of keys 35-B to 35-F are formed on the inner circumferential surface 33 of the third sleeve 31. There are fifteen ways in total of selecting each one key from the first group of keys 35-1 to 35-3 and from the second group of keys 35-B to 35-F, respectively. For example, in FIG. 1a, the key 35-2 is selected from the first group of keys 35-1 to 35-3, and the key 35-C is selected from second group of keys 35-B to 35-F. When the key 35-2 and the key 35-C are selected in this way, the keyways 96-2 and 96-C corresponding to the selected keys are formed on the outer circumferential surface 92 of the sliding sleeve 91.

In the case where one key selected from the first group of keys and one key selected from the second group of keys are formed on the third sleeve 31, only the sliding sleeve 91 on which the keyways corresponding to the selected keys are formed, can be engaged with the third sleeve 31. In other words, the sliding sleeve on which keyways different from the keyways corresponding to the selected keys are formed, cannot be engaged with the third sleeve 31. The present invention provides a configuration having these keys and keyways. Therefore, the operator can easily visually confirm the keys and keyways. Accordingly, when specific keys and specific keyways are set for a specific liquid in advance, an erroneous connection of the socket 90 for discharging liquid relating to the specific liquid in place of other socket for discharging liquid relating to other liquid can be prevented. At the same time, the correct socket can be connected promptly. Needless to mention, the flat surface 32 of the third sleeve 31 and the flat surface 93 of the sliding sleeve 91 also contribute to the prevention of an erroneous connection of the socket.

In the embodiment shown in FIG. 6 and FIG. 7, keys can be selected in a total of fifteen ways from the first group of keys and the second group of keys. Therefore, an erroneous connection of sockets for fifteen kinds of liquid can be prevented. More keys can be also selected from the first and the second group of keys, and keyways corresponding to these keys can be also formed on the sliding sleeve 91. An interval between keys of the first group of keys and the number of the first group of keys can be different from the values described above, respectively, and an interval between keys of the second group of keys and the number of the second group of keys can be different from the values described above, respectively.

Further, in the embodiment explained with reference to the drawings, the keys 35 are formed on the third sleeve 31 of the loosening prevention device 1 for a plug, and the keyways 96 are formed on the sliding sleeve 91 of the socket 90 for discharging liquid. Alternately, the keyways 96 can be formed on the third sleeve 31, and the keys 35 can be formed on the sliding sleeve 91.

While typical embodiments of the present invention are explained above, it should be understood that those skilled in the art can perform the above changes and various other changes, omissions, and additions, without deviating from the scope of the present invention.

The invention claimed is:

1. A loosening prevention device for a plug, the loosening prevention device comprising:

a first sleeve engaged with and surrounding a first plug attached to a lid of a liquid tank, the first sleeve having an inner diameter;

a second sleeve engaged with and surrounding a second plug attached to the lid;

a third sleeve integral and coaxial with the first sleeve and having an inner diameter larger than the inner diameter of the first sleeve wherein the third sleeve is engaged with and surrounds a socket connected to the first plug;

at least one key or keyway extending in an axial direction is formed on an outer circumferential surface of the socket, and at least one keyway or key engaged with the at least one key or keyway of the socket is formed on an inner circumferential surface of the third sleeve;

a connection means for connecting and fixing the first sleeve and the second sleeve with each other, wherein at least one flat surface is formed on an outer circumferential surface of both or either one of the first plug and the second plug, and at least one flat surface in surface contact with the flat surface of both or either one of the first plug and the second plug is formed on an inner circumferential surface of both or either one of the first sleeve and the second sleeve.

2. The loosening prevention device for a plug according to claim 1, wherein both or either one of the first sleeve and the second sleeve is engaged with both or either one of the first plug and the second plug by snap-fitting correspondingly.

3. The loosening prevention device for a plug according to claim 1, wherein a through-hole is formed on a shoulder between the first sleeve and the third sleeve.

4. The loosening prevention device for a plug according to claim 1, wherein at least one flat surface is formed on an outer circumferential surface of the socket, and at least one flat surface in surface contact with the flat surface of the socket is formed on an inner circumferential surface of the third sleeve.

5. The loosening prevention device for a plug according to claim 3, wherein at least one flat surface is formed on an outer circumferential surface of the socket, and at least one flat surface in surface contact with the flat surface of the socket is formed on an inner circumferential surface of the third sleeve.

* * * * *